(12) United States Patent
Ohkubo et al.

(10) Patent No.: US 6,590,857 B2
(45) Date of Patent: Jul. 8, 2003

(54) OPTICAL DISK

(75) Inventors: Akinori Ohkubo, Tsurugashima (JP); Takuma Yanagisawa, Tsurugashima (JP); Takayuki Nomoto, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 64 days.

(21) Appl. No.: 09/985,953

(22) Filed: Nov. 6, 2001

(65) Prior Publication Data

US 2002/0060980 A1 May 23, 2002

(30) Foreign Application Priority Data

Nov. 10, 2000 (JP) ......................................... 2000-343453

(51) Int. Cl.$^7$ ................................................ G11B 7/24
(52) U.S. Cl. .................................. 369/275.4; 369/275.3
(58) Field of Search ........................... 369/275.4, 275.1, 369/275.3, 277, 279, 283, 275.2; 428/64.1, 64.4

(56) References Cited

U.S. PATENT DOCUMENTS

| | | | | |
|---|---|---|---|---|
| 5,581,539 A | * | 12/1996 | Horie et al. | 369/275.4 |
| 6,023,451 A | * | 2/2000 | Kashiwagi et al. | 369/275.5 |
| 6,246,656 B1 | * | 6/2001 | Kawakubo et al. | 369/112 |
| 6,269,070 B1 | * | 7/2001 | Kikuchi et al. | 369/275.4 |
| 6,411,593 B1 | * | 6/2002 | Yoon et al. | 369/275.4 |
| 6,487,163 B1 | * | 11/2002 | Sugaya et al. | 369/275.4 |

* cited by examiner

*Primary Examiner*—Ali Neyzari
(74) *Attorney, Agent, or Firm*—Morgan, Lewis & Bockius LLP

(57) ABSTRACT

An optical disk has a recording layer recording information as a row of marks and non-marks alternately appearing in a groove formed at a track pitch of 0.280 μm or greater and a light transmissive layer formed over the recording layer, to reproduce information due to a light beam having a wavelength in a range of 375 nm to 415 nm and illuminated by an objective lens having a numerical aperture NA in a range of 0.80 to 0.90 through the light transmissive layer to the recording layer. The groove has a depth in a range of 18 nm to 32 nm.

2 Claims, 11 Drawing Sheets

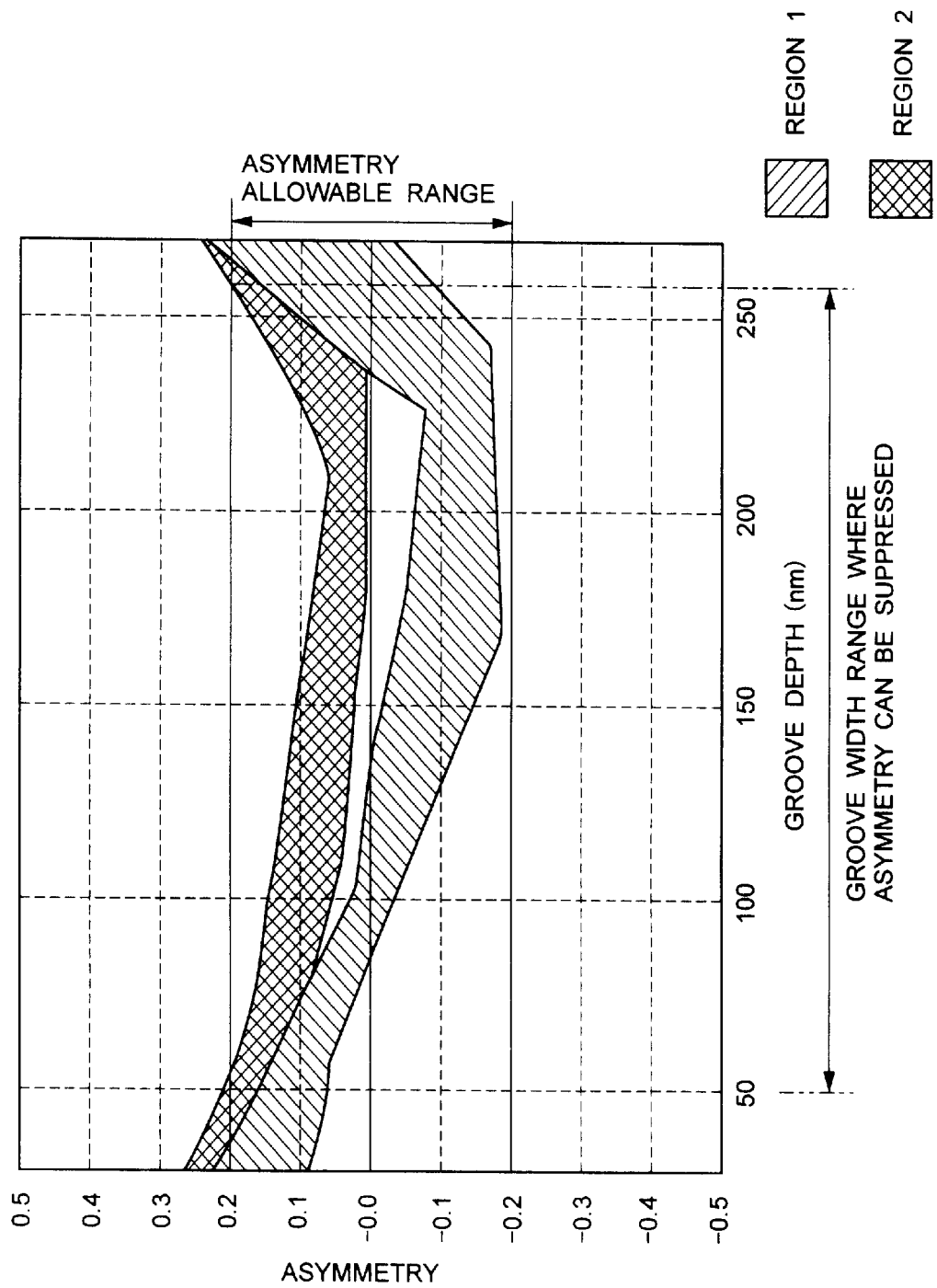

OPTICAL DISK

BACKGROUND OF THE INVENTION

1. Field of the Invention

The present invention relates to an optical disk capable of recording information in the form of a row of marks having a reflectivity different from that of the surrounding and, more particularly, to an optical disk of a groove recording type.

2. Description of the Related Art

Conventionally, there have been developed optical disks, such as DVDs (Digital Versatile Disks) as optical mediums to record information with a high density. In the DVDs, write-once type DVD-Rs (Digital Versatile Disk-Recordables) and rewritable DVD-RWs (Digital Versatile Disk-ReWritables) have been classified to groove recording type optical disks in which a groove is used for a guide. These groove-recording-schemed DVDs are manufactured under specifications of a track pitch of 0.74 μm, a data bit length of 0.267 μm and a groove depth of nearly 25 nm. The DVD has 4.7 GB in one surface, for record of MPEG 2 image signals for nearly 2 hours.

The information recording and reproducing apparatus for such a DVD has a behavior of data recording as follows: The apparatus irradiates and focuses a recording light beam according to data on a groove track GV defined between lands LDs as shown in FIG. 1 to identify a position on the groove track GV by detecting a land prepit (not shown) from the DVD. At this time, the portion on which the recording light beam has been irradiated is heated, thereby forming a record marker portion M whose reflectance differs from the ambient reflectance on that portion of the groove track GV.

The information recording and reproducing apparatus has a pickup device which includes e.g. a 4-quadrant photodetector 1 as shown in FIG. 2. The 4-quadrant photodetector 1 has a photoelectric converting device having four light-receiving surfaces 1a to 1d split into four segments by a direction along the groove tracks GV of the DVD and a direction perpendicular to the groove tracks. The light-receiving surfaces 1a and 1d are positioned in the outer track side of the DVD while the light-receiving surfaces 1b and 1c are positioned in the inner track side of the DVD.

A read light beam generator irradiates a read light beam onto the DVD that is rotated by a spindle motor, thereby forming a beam spot on the recording layer. The photoelectric converting device detects the intensity of reflected light of the information reading spot from the DVD at the four light-receiving surfaces 1a–1d and outputs reception signals Ra to Rd or electric signals corresponding to the amounts of light respectively detected by the light-receiving surfaces 1a–1d. The reception signals Ra and Rd associated with the light-receiving surfaces 1a and 1d positioned on the outer track side of the DVD are supplied to an adder 2, and the reception signals Rb and Rc associated with the light-receiving surfaces 1b and 1c positioned on the inner track side of the DVD are supplied to an adder 3. The adder 2 adds the light-receiving surfaces Ra and Rd, and the adder 3 adds the light-receiving surfaces Rb and Rc. Further, a subtracter 4 subtracts the output signal of the adder 3 from the output signal of the adder 2, and provides an output signal as a radial push-pull signal. Then, an RF signal, although not shown, may be produced by a total output electric signal corresponding to the amounts of light respectively detected by the light-receiving surfaces 1a, 1b, 1c and 1d. In addition, the push-pull signal changes in response to asymmetry with respect to the groove of the optical disk, because the light spot having the intensity distribution on the light-receiving surfaces is formed by a refracted light form the groove. The asymmetry of intensity distribution in a light spot on the light-receiving surfaces is caused from a phase difference between 0th diffraction light and ±1th diffraction light that appears when a focused light spot on the optical disk irradiated by the pickup is shifted from the groove.

The conventional groove recording optical disks such as DVD-R/RWs can record images in a high-vision digital broadcast quality for a little less than 30 minutes only. In order that a next-generation-optical-disk recording system achieves a practical recording time for the high-vision digital signal, there is a need to use a blue laser and an objective lens having a high numerical aperture NA in the pickup to further decrease a focused spot diameter and correspondingly increase the recording density to the optical disk. Generally, the optical disk can be increased in recording density by increasing the numerical aperture NA of the objective lens and shortening the wavelength λ of the laser used in recording/reproducing. This is because the beam spot on an optical disk decreases in proportion to λ/NA. Consequently, the recording/reproducing density of an optical disk can be improved by increasing NA and decreasing λ. The available DVD at present has a light transmissive layer having a thickness of 0.6 mm between an outer surface and a reflection film (recording layer) under a specification of λ=650 nm of the laser light beam and NA=0.6 of the objective lens in the optical disk system.

If the data bit length of DVD-R/RW is reduced together with the reduction in the optical spot diameter to an analogous form in order for increasing density of marks, then it is 0.117 μm/bit. However this condition is difficult to record marks because of limitation of recording property. It has been reported that the data bit length as long as nearly 0.130 μm/bit makes possible stable recording/reproducing. For example, in the case of (1, 7) RLL modulation, the conversion into a channel bit length provides 86.7 μm/bit.

Because there is a limitation in increasing density of marks in a disk tangential direction, mark density is increased in a disk radial direction. Namely, there is a need to narrow the track pitch TP. When the track pitch is further narrowed, then the push-pull signal obtained by a pickup is reduced in the vicinity of λ/16n (wherein λ represents a wavelength of the used light beam and n a refractive index in the light transmissive layer) of a groove depth Gd of DVD-R/RW, thus making impossible to obtain a practical tracking signal. Due to this condition, it is difficult to make the track pitch narrower any further. From these facts, there occurs a limitation for increase of recording density in the conventional DVD-R/RW and analogous-formed track pitch TP.

Accordingly, for the optical disk having a reduced configuration analogously formed from the conventional DVD-R/RW in which the track pitch and data bit length thereof are converted into the reduced ones with respect to the value of λ/NA, it is impossible to put it to practical use as a stable recordable optical disk system having a practical recording capacity.

OBJECT AND SUMMARY OF THE INVENTION

Therefore, the present invention has been made in consideration of the foregoing points. It is an object of the present invention to provide a next-generation optical disk capable of recording data with a high density in comparison with the conventional DVD by using a higher numericalapertured optical system and a shorter-wavelength of the light beam for reproduction.

An optical disk of the present invention has a recording layer recording information as a row of marks and non-marks alternately appearing in a groove formed at a track pitch of 0.280 μm or greater and a light transmissive layer formed over the recording layer, to reproduce the information due to a light beam having a wavelength in a range of 375 nm to 415 nm and illuminated by an objective lens having a numerical aperture NA in a range of 0.80 to 0.90 through the light transmissive layer to the recording layer, the optical disk characterized in that: the groove has a depth in a range of 18 nm to 32 nm.

According to one aspect of the present invention of the optical disk, said groove has a width in a range of 80 nm to 240 nm.

BRIEF DESCRIPTION OF THE DRAWINGS

FIG. 14 is a graph showing a variation region of a groove width and asymmetry upon an objective lens shift of 5%.

DETAILED DESCRIPTION OF THE PREFERRED EMBODIMENTS

Now, embodiments of the present invention will be explained in detail with reference to the accompanying drawings.

Figure 3:
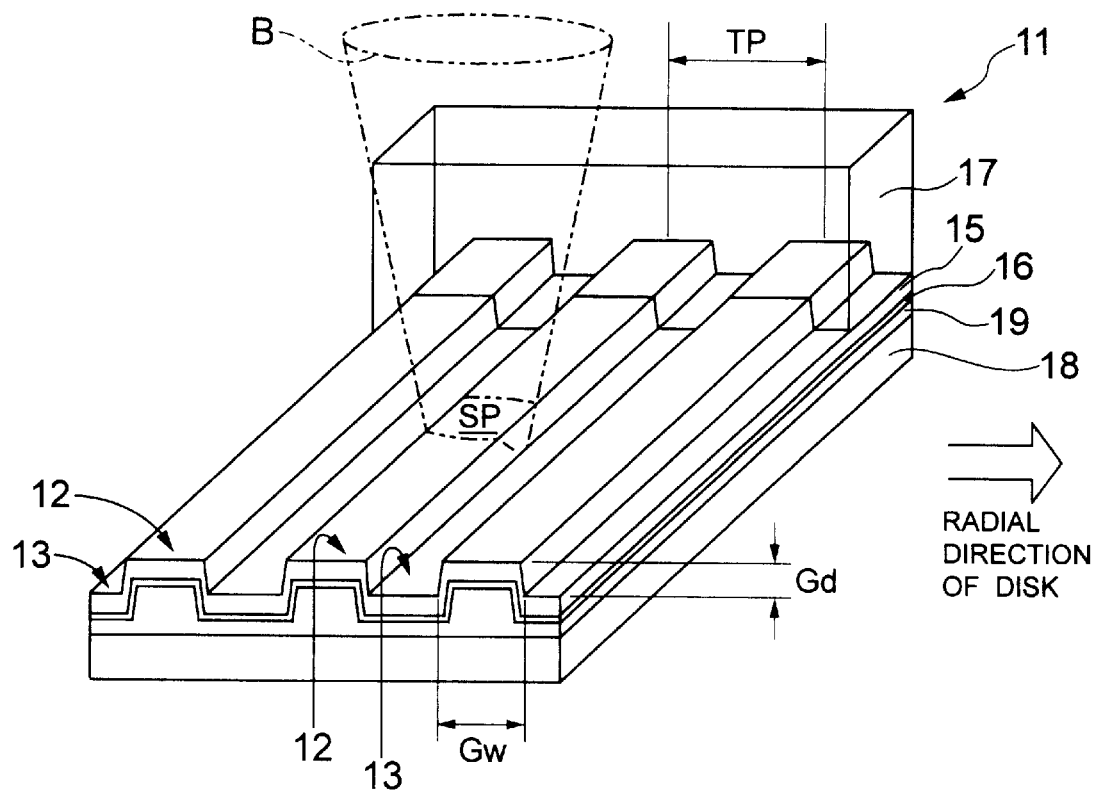
FIG. 3 is a partially cutout fragmentary perspective view of a groove-recording type optical disk according to the present invention.

FIG. 3 shows an example of a rewritable phase-change optical disk according to the present embodiment. The optical disk 11 has a recording layer 15 in a lamination structure having a medium layer formed of a phase-change material, e.g. Ag—In—Sb—Te, and glassy protection layers, e.g. Zn—SiO$_2$, sandwiching the same. A groove track 12 and a land track 13 are formed on the recording layer 15. By the juxtaposed land and groove, a laser beam B is induced as reproducing or recording light. Information is recorded as a row of marks and non-marks (unrecorded areas) to the recording layer, in the groove 12 formed in a depth Gd at a track pitch TP by a spot SP of a light beam. The optical disk 11 has a reflection layer 16 of aluminum or the like to reflect the light beam, a transparent substrate 18 of polycarbonate or the like, and an adhesion layer 19. Furthermore, a light-transmissive layer 17 made of polycarbonate is provided on a beam-incident side in order to protect them.

The inventor has devised a method of evaluating the freedom of recording-layer film thickness on the premise of a laser wavelength λ of 405 nm, an objective lens NA of 0.85, a track pitch TP of 0.30 μm and a groove width Gw of 100 nm, and found a range of groove depth Gd for a further stabilized optical disk system by using the same. As a result, it has been found that the track pitch when given 0.280 μm–0.325 μm requires a groove depth within a range of 18 nm–32 nm. The inventor has introduced a concept of film-design freedom as an evaluation function of recording layer characteristics to determine an optimal track pitch and groove depth for the optical disk system by computer simulation.

Figure 4:
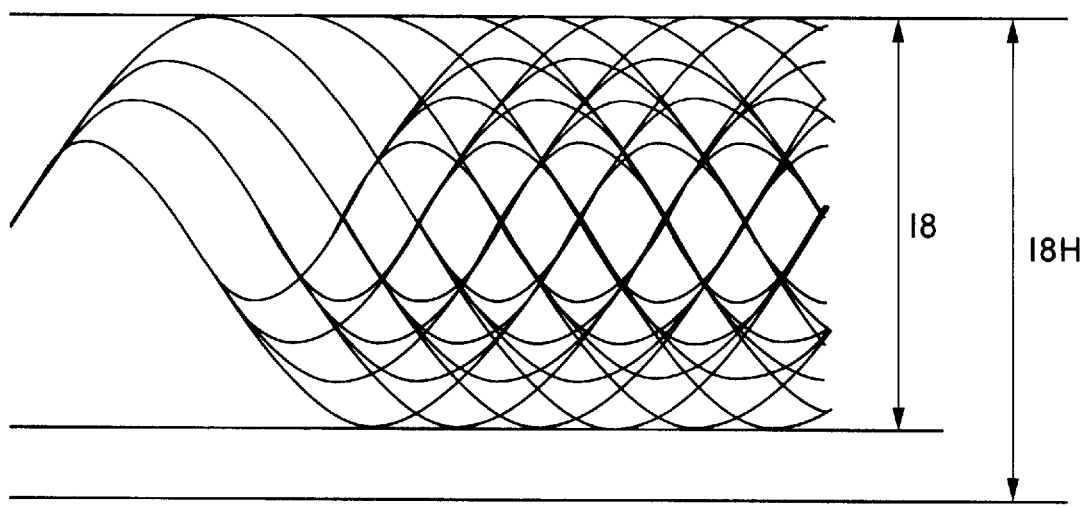
FIG. 4 is a graph showing a change of an RF modulation amplitude signal in the case of (1, 7) RLL modulation.

In the recording-type disk, the recorded marks change in its characteristics in various ways depending upon the recording-layer composition, film thickness, layer structure and the like. The inventor has concentrated on two parameters of a mark reflectivity and a mark phase as mark characteristics, to aim at obtaining a greater RF-signal amplitude modulation factor. The mark reflectivity is defined as a value of division of a reflectivity on a mark by a reflectivity on a non-mark in the optical disk. The mark phase is defined as a difference in phase between the mark and the non-mark in the optical disk. The RF-signal amplitude modulation factor is defined as a ratio of a reproduced RF signal amplitude to a maximum amplitude value of the RF signal. This modulation factor, in the case of (1, 7) RLL modulation shown in FIG. 4 for example, is defined as I8/I8H with using an RF-signal amplitude I8 and the maximum amplitude I8H. Accordingly, RF-signal amplitude modulation factor is expressed by a value of from 0 to 1.

RF-signal amplitude modulation factor shows a particular distribution corresponding to a groove depth on a coordinate having a mark reflectivity and a mark phase in a horizontal axis and a vertical axis respectively, which varies depending on a mark reflectivity and mark phase. Namely, every RF-signal amplitude modulation factor is shown as curves in a particular distribution contour diagram in accordance with at least a groove depth in a mark characteristics. For example, FIGS. 5 and 6 shows such mark characteristics i.e., distributions of the RF-signal amplitude modulation factor as contour diagrams in both the cases of (TP=0.3 μm, Gd=8 nm, Gw=100 nm) and (TP=0.3 μm, Gd=32 nm, Gw=100 nm) respectively.

Figure 5:
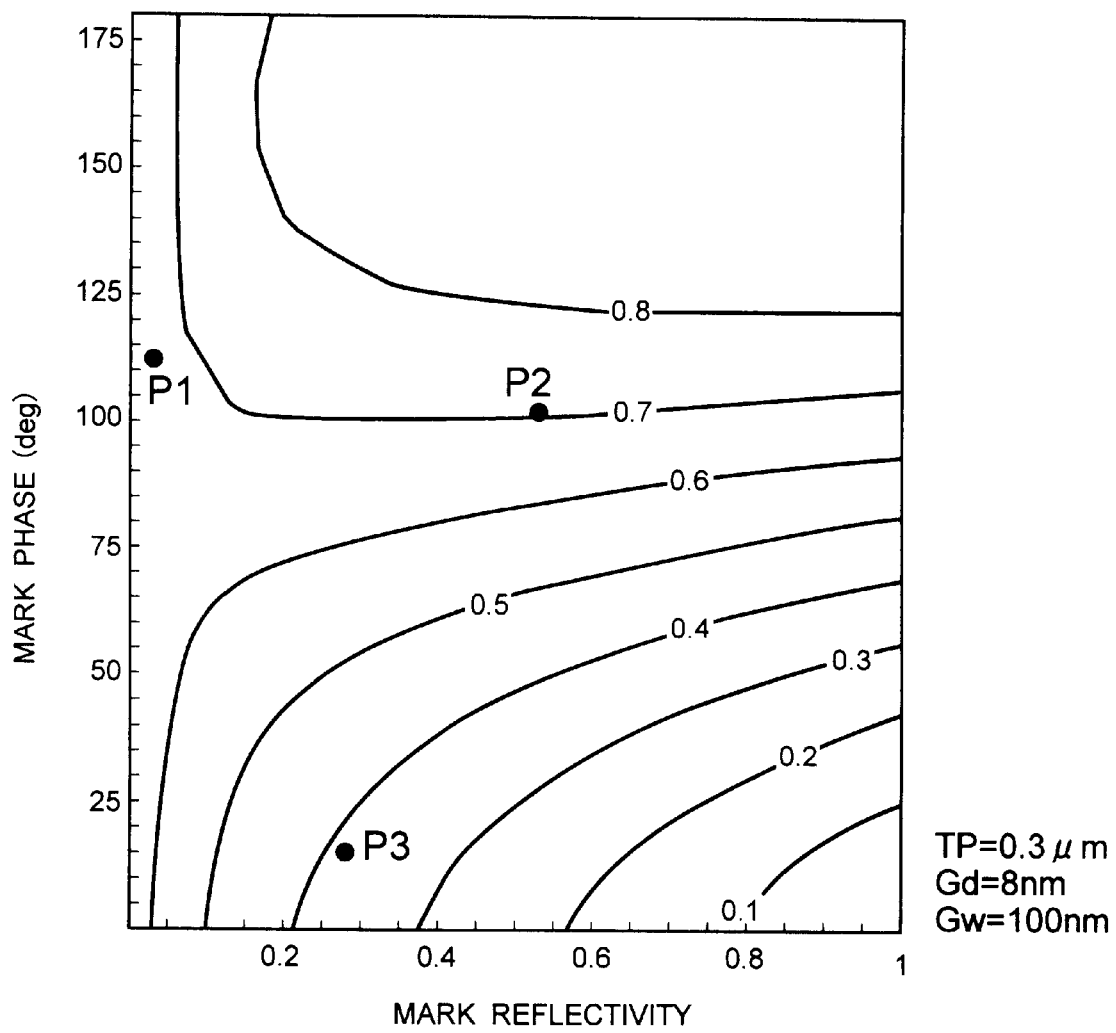
FIG. 5 is a graph showing a distribution of RF amplitude modulation factors in the case of a groove depth of 8 nm of an embodiment of the optical disk according to the invention.
Figure 6:
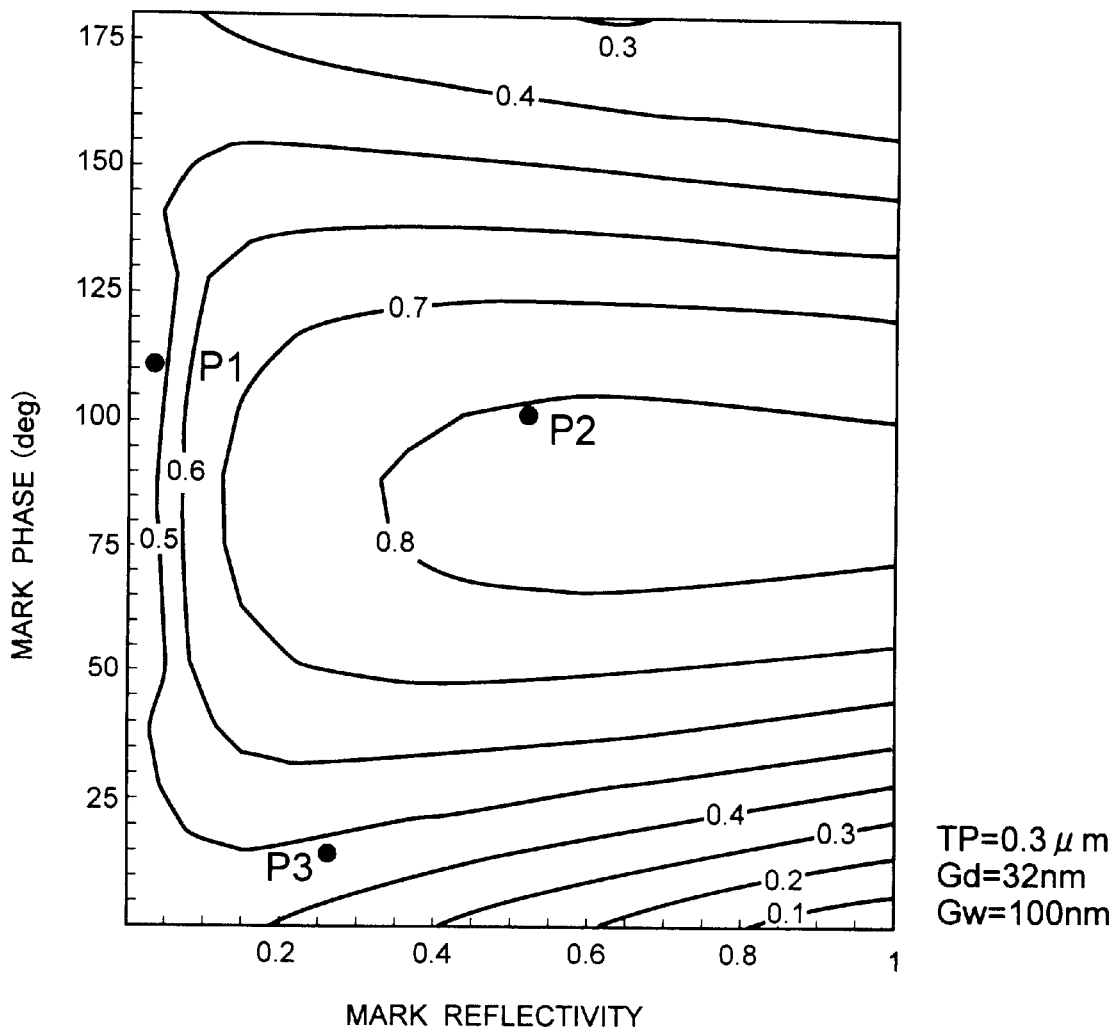
FIG. 6 is a graph showing a distribution of RF amplitude modulation factors in the case of a groove depth of 32 nm of another embodiment of the optical disk according to the invention.

At this point, the inventor defines a ratio of an area in a range of RF-signal amplitude modulation factor 0.6 and greater to an area of RF-signal amplitude modulation factor 1, in a graph representing a dependency of the RF-signal amplitude modulation factor on the mark characteristics as in FIGS. 5 and 6, i.e., as good area (%). Because the DVD standard book requires RF-signal amplitude modulation factor of 0.6 or greater, such a value is used as a reference. In other words, provided that the function representing a ratio of a good area range is given F (λ, NA, TP, Gd) in the entire range of a mark reflectivity of less than 1 and mark phase of less than 180 degrees, track pitch TP and groove depth Gd are set to satisfy F (λ, NA, TP, Gd)>0.5 or greater, preferably 0.6 or greater.

Figure 7:
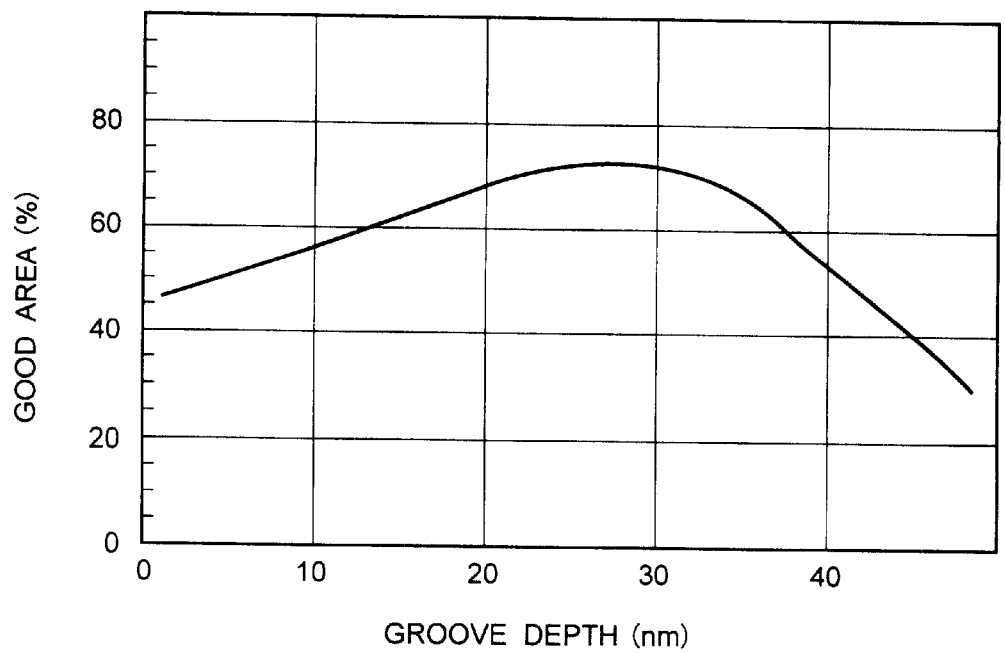
FIG. 7 is a graph showing a relationship between an area ratio and a groove depth in which the area ratio is an area in a range of RF-signal amplitude modulation factor of 0.6 and greater to an area of RF-signal amplitude modulation factor of 1 in a graph representing a mark characteristic of the optical disk of another embodiment according to the invention.

FIG. 7 is a graph showing a relationship between a good area and a groove depth of the embodiment. As apparent from FIG. 7, good area has a dependency upon a groove depth. If it is considered that the recording layer is sufficiently easy to design with a good area of 62.5% or greater, a groove-depth range of 18 nm to 32 nm is satisfactory.

Figure 8:
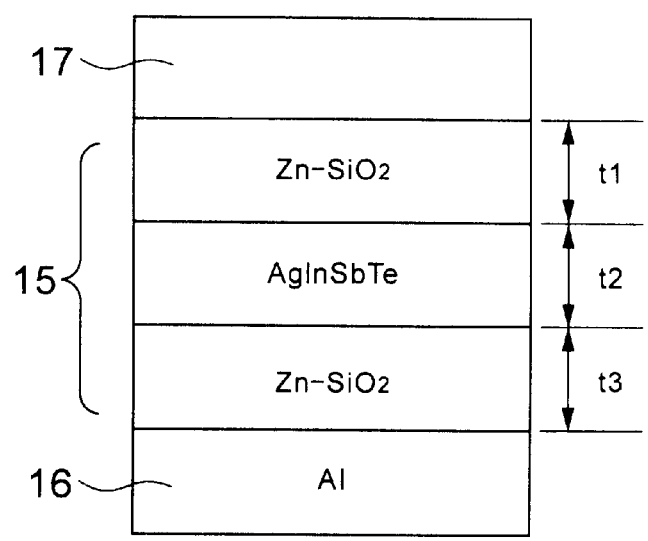
FIG. 8 is a structural view showing a detail of a layer structure in the optical disk of another embodiment according to the invention.

In a second embodiment, a computer simulation is made on phase-change optical disks each having a recording layer 15 similar to FIG. 3 which is composed of a medium layer of a phase-change material AgInSbTe and Zn—$SiO_2$ protection layers sandwiching the same as shown in FIG. 8. In FIG. 8, t1, t2 and t3 represent film thicknesses of Zn—$SiO_2$, AgInSbTe and Zn—$SiO_2$ respectively. The phase-change optical disks are manufactured for examples so that sets of film thicknesses of the recording layer 15 are changed as the following P1 to P3.

P1: (t1=100 nm, t2=7 nm, t3=35 nm)
P2: (t1=100 nm, t2=8 nm, t3=37 nm)
P3: (t1=80 nm, t2=6 nm, t3=38 nm)

The mark characteristics of the phase-change optical disks are fallen onto positions as shown at P1 to P3 in FIGS. 5 and 6. It can be seen that these mark characteristics largely differ depending on the film-thickness combination.

Further, another computer simulation is made on the case that the film-thickness combination in the structure of FIG. 8 is changed in a manner that t1 is changed in a range of 95 nm to 105 nm, t2 is in 5 nm–7 nm and t3 is fixed at 35 nm. Selecting 800 kinds from vast film-thickness combinations, the mark characteristics are respectively calculated for of the phase-change optical disks.

Figure 9:
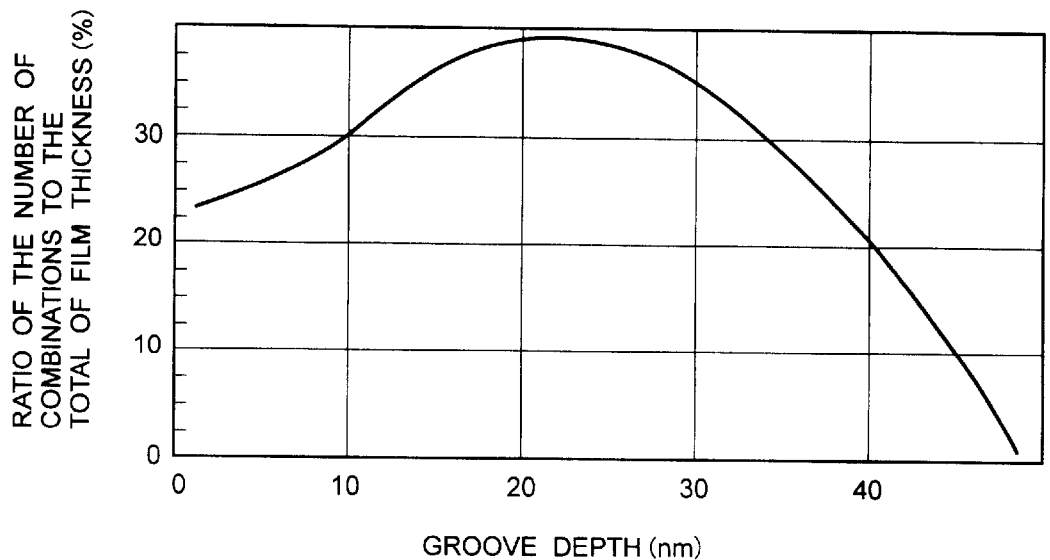
FIG. 9 is a graph showing a relationship between a ratio of the number of film-thickness combinations and a groove depth in which that ratio is the number of film-thickness combinations satisfying a modulation factor of 0.6 or greater to the total number of a certain population of combinations in the optical disk of another embodiment according to the invention.

FIG. 9 is a calculation result of graph which shows a relationship between a ratio of the number of film-thickness combinations and a groove depth in which such a ratio is a ratio of the number of combinations of film thickness having a mark characteristic satisfying RF-signal amplitude modulation factor 0.6 or greater to the number of the abstracted combinations. As apparent from the graph of FIG. 9, it is understood that, as the groove depth increases greater than 32 nm, immediately reduced is the number of combinations of the film-thicknesses having a mark characteristic of RF-signal amplitude modulation factor 0.6 or greater.

Namely it can be seen that, as the broader is the area of a range satisfying RF-signal amplitude modulation factor 0.6 or greater in a two-dimensional graph representing a mark characteristic, e.g. FIGS. 5 and 6, enhanced is the film-thickness selectivity in lamination design, i.e. freedom.

As understood from the comparison between FIG. 7 and FIG. 9, taking into account film-design freedom, there is a correlation between the good area and the combination ratio of the film thicknesses having a mark characteristic satisfying a predetermined modulation factor. Accordingly, it can be considered in the graph showing an RF-signal amplitude modulation factor dependency on a mark characteristic as shown in FIGS. 5 and 6 that the ratio of a region area satisfying RF-signal amplitude modulation factor 0.6 or greater (good area) be film-design freedom.

This is generally true for other recording layers, irrespectively of the recording-layer composition, layer structure and film-thickness range described in the embodiment.

The above embodiment has showed the case of a laser wavelength λ of 405 nm, an objective lens NA of 0.85 and a track pitch TP of 0.030 μm. The present inventor has conducted a further computer simulation on the dependency of good area and groove depth in the case of an objective lens NA of from 0.80 to 0.690, a laser wavelength λ of from 375 nm to 415 nm and a track pitch TP of form 0.325 μm to 0.280 μm. As a result, this has been confirmed to similarly stand within the range of the following formulas (1) to (3).

$$0.28 \leq TP(\mu m) \leq 0.325 \tag{1}$$

$$375 \leq \lambda(nm) \leq 415 \tag{2}$$

$$0.8 \leq NA \leq 0.9 \tag{3}$$

However, provided that tracking can be stably carried out with a push-pull signal amplitude of 0.12 or greater when the groove depth is 18 nm, the region satisfying this can be expressed by the following formula (4) using TP, λ and NA as parameters.

$$8000TP(\mu m) - 9\lambda(nm) + 3600NA \geq 1745 \tag{4}$$

Namely, if within the range of the formulas (1) to (4), stable tracking is available with a groove depth of 18 nm or greater.

Figure 10:
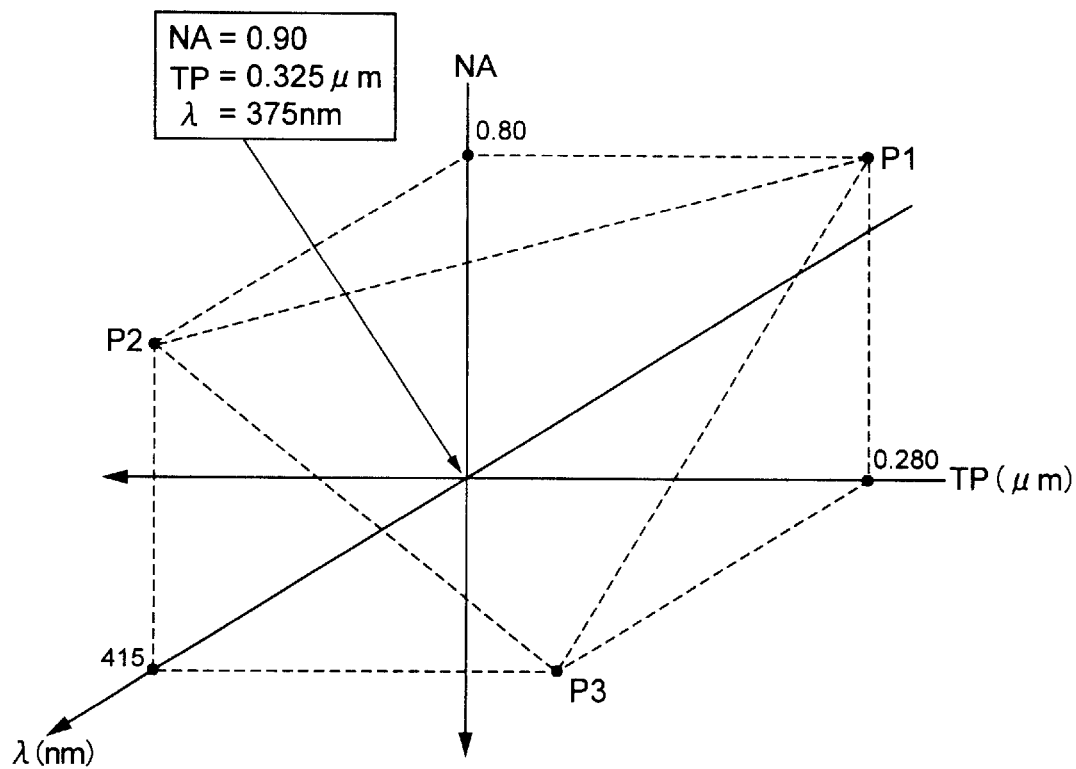
FIG. 10 is a graph showing a range of an objective lens NA and track-pitch TP suited as an orthogonal coordinate having as axes a laser wavelength λ, an objective lens NA and track pitch TP in the optical disk of the embodiment.

FIG. 10 illustrates the range of formulas (1) to (4) on an orthogonal coordinate having, as axes, laser wavelength λ, objective lens NA and track pitch TP. The boundary plane of formula (4) is a plane including the points of P1, P2 and P3 in FIG. 10.

Figure 11:
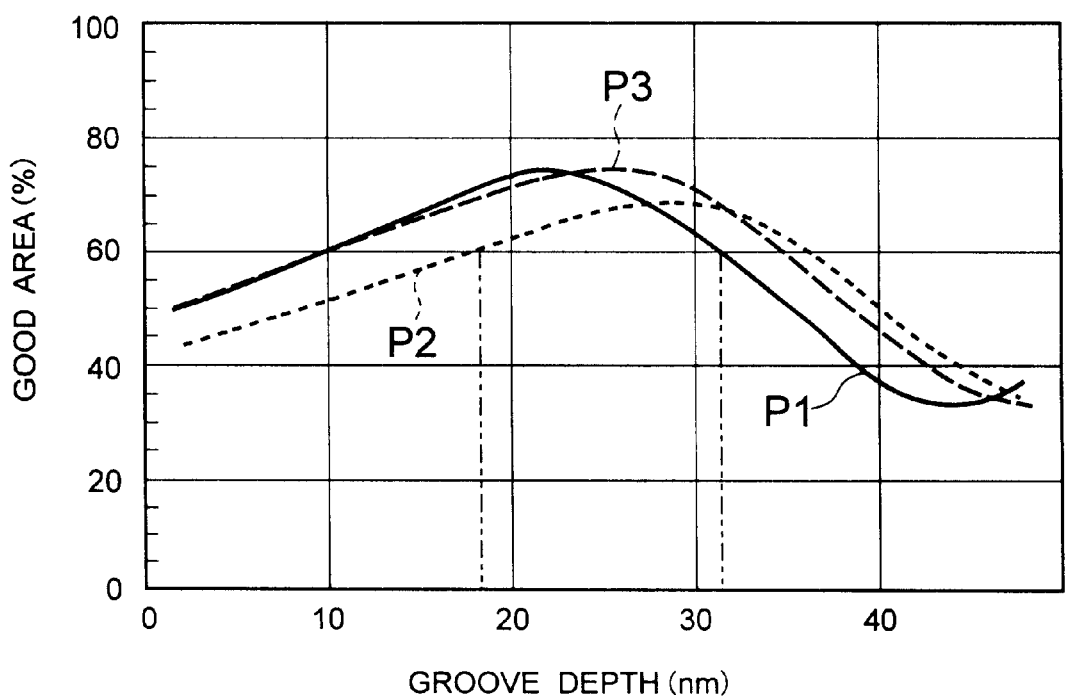
FIG. 11 is a graph showing characteristic curves of good area to groove depths at points of P1, P2 and P3 in FIG. 10.

The dependency of good area on groove depth in the range of formulas (1) to (4) with Na, λ and TP shown in FIG. 10 was calculated by taking, as an example, the points of P1, P2 and P3 of FIG. 10. FIG. 11 shows a calculation result, showing a relationship between a good area and a groove depth. In this case, as apparent from FIG. 11, it is can be seen that a good area of 60% or greater is satisfied if the groove depth is 32 nm or smaller at the point P1 (TP=0.28 μm, NA=0.8) and the groove depth is 18 nm or greater at the point P2 (λ=415 nm, NA=0.8). It has been confirmed that, if the groove depth is taken 32 nm or smaller even in the range of the formulas (1) to (4) shown in FIG. 10, the good area is 50% or greater thus facilitating film-thickness design.

Figure 12:
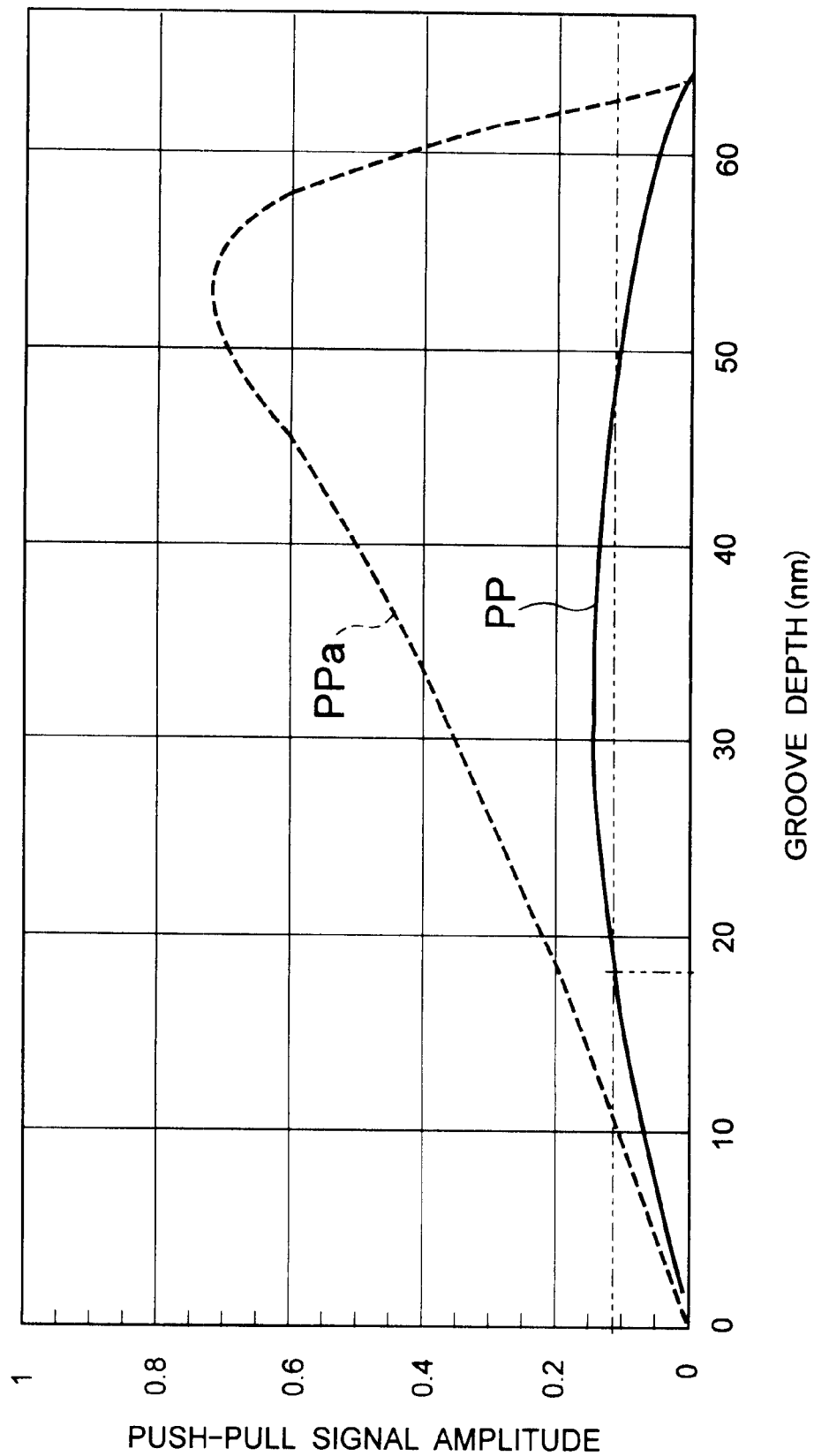
FIG. 12 is a graph showing a push-pull signal amplitude change relative to a groove depth at around recording on the optical disk of the embodiment.

The range of a push-pull signal amplitude of 0.12 or greater was taken as a target value in conformity to the standard of DVD-R/RW. From the standard book, the push-pull signal amplitude PPa after recording is derived as $0.183 \leq PPa \leq 0.73$. Simulating the amplitude change in the push-pull signal with respect to a groove depth at around recording, if the push-pull signal amplitude PP before recording is given 0.12 or greater as shown in FIG. 12, then full satisfaction is provided in PPa to place tracking free from instability.

Generally, if the track pitch TP is excessively narrow, the push-pull signal amplitude becomes small to make tracking unstable resulting in the optical disk system out of establishment. However, the optical disk of the invention employs a groove depth of 18 nm or greater, resultingly making possible to obtain a further stabilized tracking (push-pull) signal. Simultaneously, the groove depth given 32 nm or smaller facilitates the design of a recording layer that the RF-signal amplitude modulation factor of an optical disk after recording is to be obtained with sufficient magnitude. From the above, the groove depth in a range of 18 nm–32 nm makes possible to realize a stable groove-recording type optical disk capable of keeping a necessary-and-sufficient recording capacity.

In a further embodiment of the invention, an optical disk having a groove to which information is recorded is structured to have compatibility with a read-only ROM optical disk, after recording.

The tracking error detecting scheme for a ROM optical disk usually uses the differential phase detection (DPD). Accordingly, it is possible to detect, by DPD, a tracking error signal even on an optical disk having the grooves of the embodiment.

The problem with DPD includes asymmetry caused due to objective lens shift. It is well known that this phenomenon is due to the cause of deviation in a pit optical phase difference of greater than $\lambda/4$.

In the optical disk of the invention, there are grooves and marks in place of pits to have further complicated phase structure, wherein asymmetry is expected to occur. Asymmetry must be sufficiently suppressed, because it causes on-track positional deviation of a spot and hence results in serious defect in reproducing signals. For this reason, asymmetry was computed on the basis of the DPD tracking error signal detecting scheme, thereby calculating and evaluating a proper groove width Gw.

Figure 1:
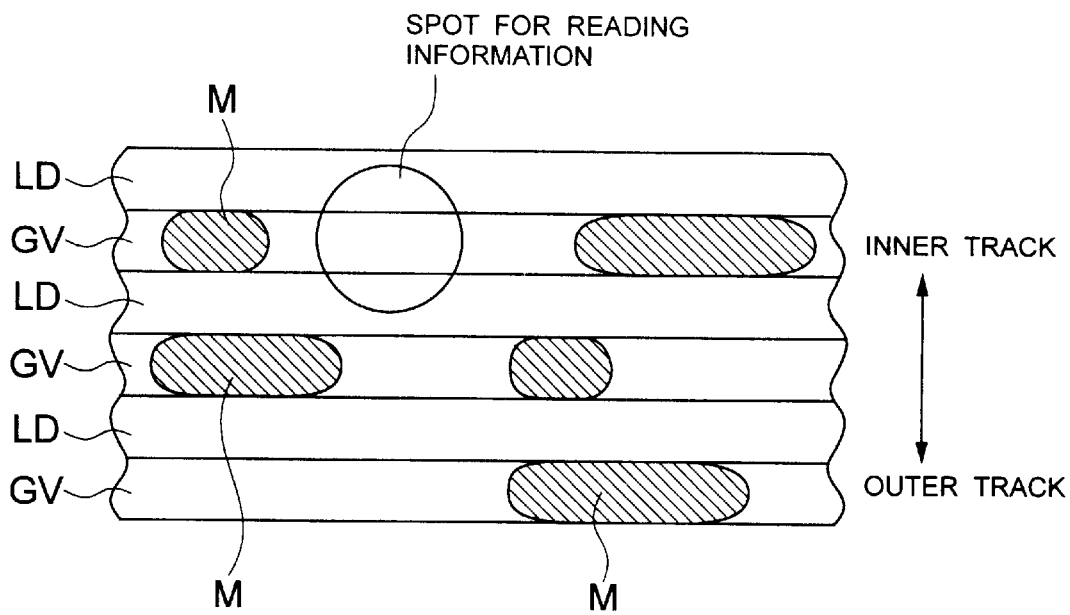
FIG. 1 is a partially enlarged plan view of a groove recording type optical disk.
Figure 2:
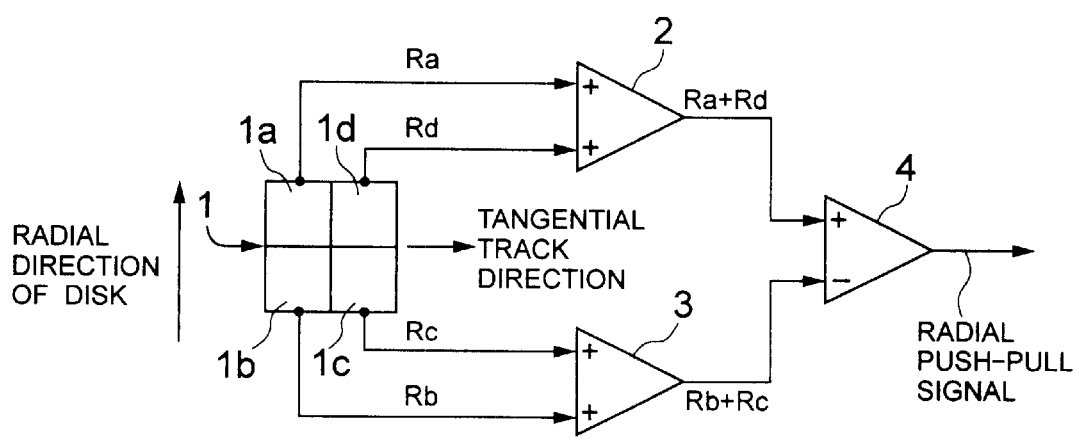
FIG. 2 is a block diagram showing the structure of a photodetector in a pickup device.
Figure 13:
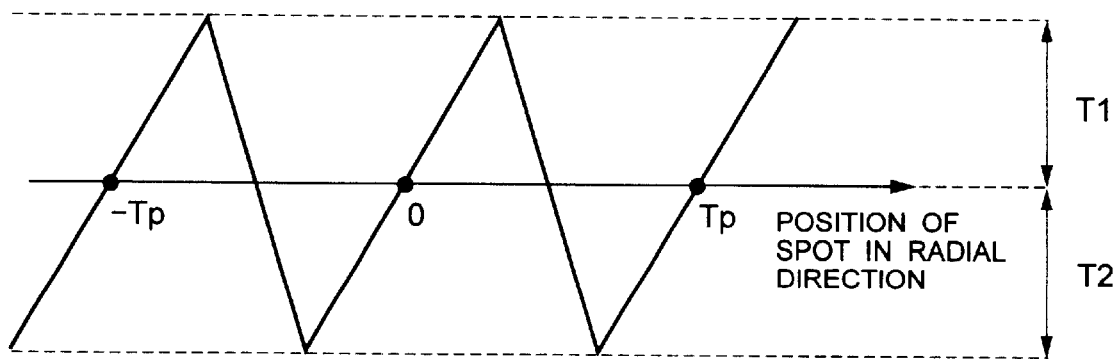
FIG. 13 is a graph for explaining a method to derive a tracking error signal and asymmetry in the differential phase detection method.

The tracking error signal is generated in such a manner that, in the pickup device shown in FIG. 2, vertical outputs of Rb+Rd and Rc+Ra of the 4-quadrant photodetector 1 are supplied to a phase comparator (not shown). In this case, the change in the tracking error signal intensity T1, T2 is measured in a region of from a reference point 0 of a radial spot position to a track pitch±TP as shown in FIG. 13, thereby deriving asymmetry by the following formula while changing the groove width.

$$\text{Asymmetry}=(T1-T2)/(T1+T2)$$

FIG. 14 is a graph showing a variation region of a groove width and asymmetry upon shifting the objective lens by 5%, due to the result of calculation. In the figure, region 1 shows an asymmetry variation region within the above range for a groove depth of 32 nm. The region 2 shows an asymmetry variation region within the above range for a groove depth of 18 nm.

Because there is a need to practically reduce asymmetry to an absolute value 0.2 or smaller, as apparent from FIG. 14, the groove width Gw is limited to a range of 50 nm–260 nm, further preferably 80 nm–240 nm. Accordingly, by obtaining a tracking error signal by DPD and restricting the groove width thereof, the asymmetry can be suppressed within a practical range.

Although the above embodiment explained, as an example, the layer structure shown in FIG. 8, the invention is similarly materialized for the cases of other film compositions, layer structures or film-thickness ranges. Namely, the invention is materialized not only on an optical disk using phase-change material film but also on an optical disk using an organic pigment film.

Besides the single-layer structured optical disks, the invention is similarly materialized on an optical disk having a recording layer having two or more layers.

Besides the optical disk having a recording layer on one surface, the invention is similarly materialized on an optical disk having recording layers on both surfaces.

In the invention, the groove depth was provided in the range of 18 nm–32 nm where sufficient amplitude is available in the push-pull signal. Accordingly, even if the track pitch is narrowed than a $\lambda$/NA-converted value of the conventional DVD-R/RW, stable tracking is possible to carry out. As a result, the recording density is increased, and recording-layer design for obtaining sufficient modulation factor is facilitated.

According to the present invention, because the asymmetry in a DPD tracking signal is suppressed by making a groove width of 50 nm–260 nm, compatibility can be sufficiently secured when reproducing a recorded optical disk on an exclusive reproducer using DPD for the tracking signal.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese Patent Application No. 2000-343453 which is hereby incorporated by reference.

What is claimed is:

1. An optical disk comprising:
   a substrate;
   a recording layer formed on the substrate and having a groove formed at a track pitch of 0.280 μm or greater for recording information as a row of marks and non-marks alternately appearing in the groove; and
   a light transmissive layer formed over said recording layer,
   characterized in that said groove has a depth in a range of 18 nm to 32 nm on condition that reproducing of information is preformed in a way that a light beam having a wavelength in a range of 375 nm to 415 nm is illuminated by an objective lens having a numerical aperture NA in a range of 0.80 to 0.90 through said light transmissive layer to said recording layer.

2. An optical disk according to claim 1, wherein said groove has a width in a range of 80 nm to 240 nm.

* * * * *